G. W. McGILL.
TRACTION MACHINE.
APPLICATION FILED JUNE 13, 1907.

956,143.

Patented Apr. 26, 1910.

Witnesses
Frank R. Glor.
H. C. Rodgers.

Inventor
G. W. McGill.
By George H. Thorpe
Atty

UNITED STATES PATENT OFFICE.

GEORGE W. McGILL, OF ENID, OKLAHOMA.

TRACTION-MACHINE.

956,143.  Specification of Letters Patent.  Patented Apr. 26, 1910.

Application filed June 13, 1907. Serial No. 378,867.

*To all whom it may concern:*

Be it known that I, GEORGE W. MCGILL, a citizen of the United States, residing at Enid, in the county of Garfield, Oklahoma, have invented certain new and useful Improvements in Traction-Machines, of which the following is a specification.

This invention relates to traction machines and is designed more especially as an improvement on my similarly entitled machine on which Letters Patent #867,828 were issued to me Oct. 8, 1907, my special object in this connection being to produce a machine possessing the advantageous features of the one referred to but which can be manufactured and sold at less cost and is of simpler construction and more readily controlled.

To this end the invention consists in certain novel and peculiar features of construction and organization as hereinafter described and claimed; and in order that it may be fully understood reference is to be had to the accompanying drawing, in which—

Figure 1:
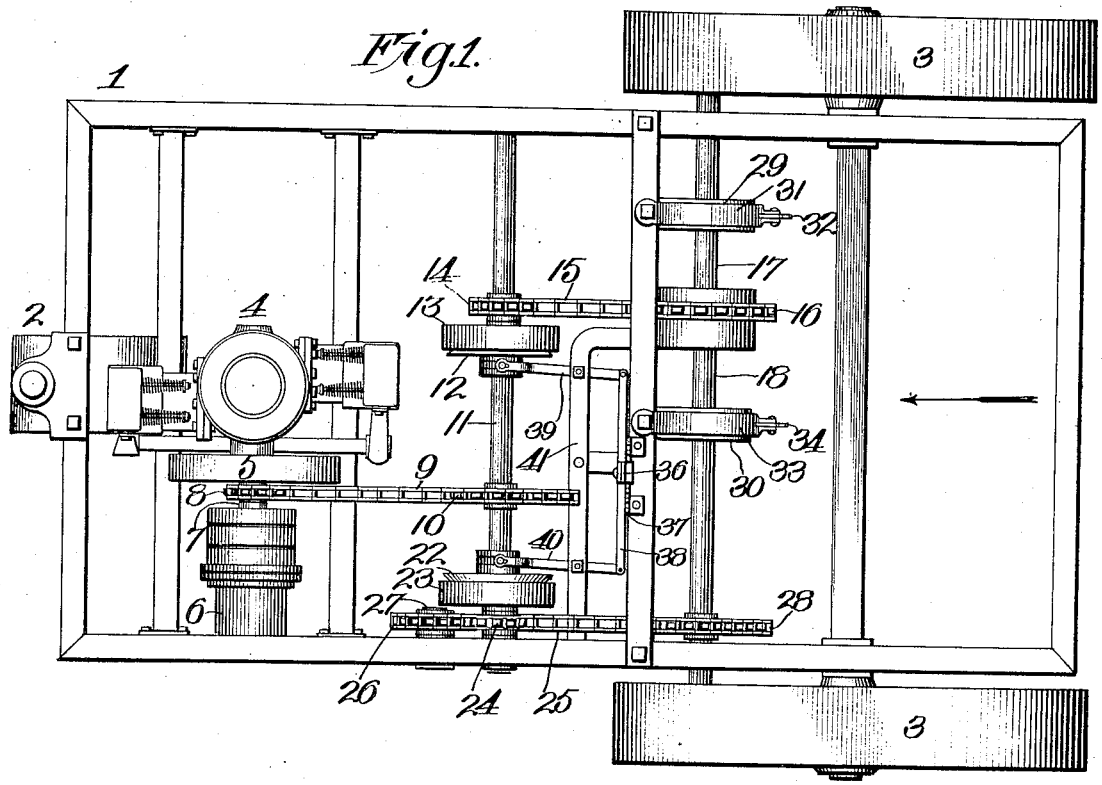
Figure 2:
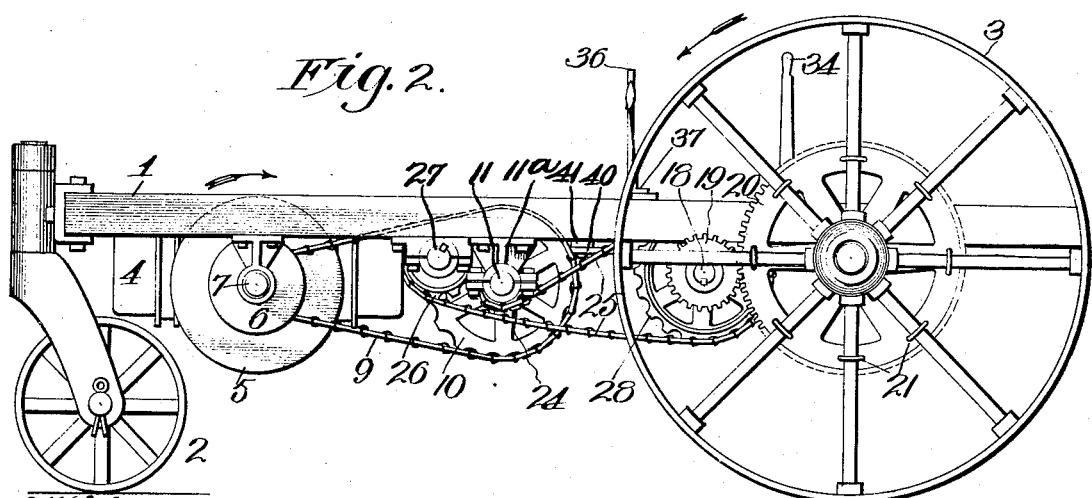

Figure 1, is a plan view of a traction machine embodying my invention. Fig. 2 is a side view of the same.

In the said drawings, a wheeled frame consists of a substantially horizontal rectangular skeleton bed 1, a caster 2, supporting one end of said bed and wheels 3 supporting the opposite end.

4 indicates an engine mounted on the bed and having a fly wheel 5.

A speed gear transmission indicated only by its casing 6, is adapted to be driven by the shaft not shown, of the engine, the shaft 7, of the transmission mechanism being equipped with a sprocket wheel 8 connected by a chain 9, with the sprocket wheel 10 rigidly secured on transverse shaft 11 journaled in the bed 1, or rather in bearings 11ª depending from the bed, by preference.

A clutch consists of the friction disk 12 connected to slide upon and rotate with shaft 11, and the companion friction disk 13 journaled on the shaft 11 and equipped with a sprocket wheel 14 connected by chain 15 with the sprocket wheel 16 of the type known as a compensating wheel and common in automobile construction. The compensating wheel 16 is mounted upon a pair of alined transverse shafts 17 and 18 suitably journaled and equipped at their outer ends with similar gears 19 meshing with larger gears 20 rigid with wheels 3 preferably by being secured on the spokes of the latter as shown at 21 in Fig. 2. The compensating wheel is adapted under ordinary conditions to rotate shafts 17 and 18 at the same speed or permit either of said shafts to be retarded without interfering with the operation of the companion shaft.

A second clutch mounted on shaft 11 comprises the friction disk 22, rotatable with and slidable on the shaft and the companion friction disk 23 journaled on the shaft and equipped with a sprocket wheel 24.

25 is a sprocket chain engaging an idler sprocket wheel 26, at the opposite side of shaft 11 from wheels 3 and journaled on a stub shaft 27 supported from the bed 1 as shown or in any other suitable manner. Chain 25 also engages a sprocket wheel 28 secured rigidly on shaft 18, the upper strand of the sprocket chain 25 being depressed below and engaging the lower side of sprocket wheel 24.

29 and 30 indicate brake wheels secured rigidly on shafts 17 and 18 respectively.

31 indicates a strap-brake engaging wheel 29 and of common and well known construction and connected in the usual manner to a lever 32 so that the operation of said lever shall cause the strap to bind upon wheel 29 and thus retard the speed of shaft 17 as hereinafter referred to. A similar strap-brake 33 engages brake wheel 30 and is similarly connected to the lever 34 corresponding to lever 32 so that the operation of such lever 34 shall clamp the brake strap 33 on wheel 30 and thus retard the speed of shaft 18.

36 indicates a lever pivoted to a sector 37 mounted on the bed and 38 a bar pivotally carried by the lever and pivotally connecting the corresponding ends of a pair of levers 39 and 40 mounted on a part 41 of the bed and pivotally connected to the clutch members 12 and 22, the arrangement being such that when one of the clutch mechanisms is in operative relation the other is in inoperative relation.

Assuming that the parts are as shown and that the machine is to travel in the direction indicated by the arrow, Fig. 1, the engine will operate so as to drive wheel 5 in the direction indicated by the arrow Fig. 2, like motion being transmitted through chain 9 and wheel 10 to shaft 11 and such movement of the shaft through the clutch 12—13, wheel 14 and chain 15 to the compensating wheel 16, the latter driving shafts 17 and 18 at equal speed so as to impart movement from wheels 19 and 20 to wheels 3 in the direction indicated by the arrow Fig. 2, it being understood in this connection that the clutch disks 22—23 are disengaged. Should it be desired to turn the machine to the right or left while traveling as described, the right or left hand lever 32 or 34 will be operated, the result being the speed of the corresponding shaft 17 or 18 as the case may be, will be retarded so as to cause the retarded wheel 3 to act as a pivot for the right or left hand turn as the case may be. Should the operator desire to reverse the direction of travel without turning the machine, that is, travel with the caster trailing in the rear, the parts remain in the positions shown in Fig. 1, and the chain 9 is reversed, by reversing the transmission shaft 7, the means for accomplishing this purpose being omitted because of well known construction and furthermore because applicant makes no claim to the same, it being noticed that in either of the movements described, the revolution of the clutch member 23 through its engagement with chain 25 is inoperative, that is to say it turns freely on shaft 11 without affecting the operation of the latter.

Instead of turning the machine by retarding the speed of either of the shafts 17 or 18, through the agency of the connected brake, it may be turned in one direction by operating lever 36 so as to disengage clutch section 12 from clutch section 13 and throw clutch section 22 into engagement with clutch section 23. As a result of this operation chain 15 ceases to operate and chain 25 through the connected gearing, rotates the adjacent wheel 3 backward so that the machine turns to the left, the left-hand wheel 3 circling around the right hand wheel 3, the latter forming the pivot of such motion. For making a wide turn the proper brake is employed. For making a short or sharp turn at a corner of the field, it is preferable to operate the lever 36 as explained, it being understood in this connection that as the machine is run with the same wheel 3 at the inside or toward the field irrespective of whether the caster is leading or trailing, it is unnecessary to provide means for reversing both of the wheels 3.

This machine as explained in the aforesaid patent is intended primarily to drag a plow when traveling in the direction indicated by the arrow Fig. 1, and to carry a header when traveling in the opposite direction and reference is herewith made to said application for a full understanding of the reasons why the machine is run in the manner explained, the claims in the present application being to the mechanism whereby the same results are secured.

From the above description it will be apparent that I have produced a traction engine possessing the features of advantage enumerated and I wish it to be understood that I do not desire to be restricted to the exact details of construction shown and described as obvious modifications will suggest themselves to one skilled in the art.

Having thus described the invention what I claim as new and desire to secure by Letters-Patent, is:—

1. In a machine of the character described, a wheeled frame, a pair of longitudinally alined shafts geared to wheels of said frame, a driven shaft, a clutch mechanism mounted thereon and comprising a friction disk rotatable with and longitudinally adjustable on said shaft, a friction disk journaled on said shaft, and a wheel movable with the last-named disk, a wheel suitably journaled at the opposite side of the driven shaft from the first-named shafts, an endless chain connecting one of the first-named shafts and the last-named wheel and having one of its strands in engagement with the wheel movable with said friction disk, and means to throw said friction disks in or out of engagement.

2. In a machine of the character described, a wheeled frame, a driven shaft journaled therein, a pair of shafts geared to the wheels of the frame, a compensating wheel mounted on said shafts, a clutch mechanism mounted on the driven shaft and connected to the compensating wheel, a second clutch mechanism mounted on the driven shaft and provided with a wheel, an idler wheel suitably journaled and a second wheel secured on one of the first-named shafts, a chain connecting the last-named wheels and having one of its strands engaging the wheel of the last-named clutch mechanism, and means for simultaneously operating said clutch mechanisms to throw one into operative and the other into inoperative relation.

3. In a machine of the character described, a wheeled frame, a driven shaft journaled therein, a pair of shafts geared to the wheels of the frame, a compensating wheel mounted on said shafts, a clutch mechanism mounted on the driven shaft and connected to the compensating wheel, a second clutch mechanism mounted on the driven shaft and provided with a wheel, an idler wheel suitably journaled and a second wheel secured on one of the first-named shafts, a chain connecting the last-named wheels and having one of its strands engaging the wheel of the last-named clutch mechanism, means for simultaneously operating said clutch mechanisms to throw one into operative and the other into inoperative relation, and a brake mechanism for each of the shafts upon which the compensating wheel is mounted.

In testimony whereof I affix my signature, in the presence of two witnesses.

GEORGE W. McGILL.

Witnesses:
W. P. M. STEVENS,
G. Y. THORPE.